Dec. 30, 1969   A. L. HUBBARD   3,487,450
BLOWER MEANS FOR COTTON HARVESTER

Filed May 21, 1968   2 Sheets-Sheet 1

INVENTOR.
A. L. HUBBARD

BY William A. Murray

ATTORNEY

Dec. 30, 1969

A. L. HUBBARD 3,487,450

BLOWER MEANS FOR COTTON HARVESTER

Filed May 21, 1968

INVENTOR.
A.L. HUBBARD

BY William A. Murray

ATTORNEY

United States Patent Office 3,487,450
Patented Dec. 30, 1969

3,487,450
BLOWER MEANS FOR COTTON HARVESTER
Arthur Lowell Hubbard, Des Moines, Iowa, assignor to Deere & Company, Moline, Ill., a corporation of Delaware
Filed May 21, 1968, Ser. No. 730,816
Int. Cl. B65g *53/10*
U.S. Cl. 302—17                                8 Claims

ABSTRACT OF THE DISCLOSURE

A combination blower and manifold in which the blower pressurizes the manifold and the manifold has a plurality of outlets that receive flexible ducts extending to the discharge conveyors of a cotton harvester.

BACKGROUND OF THE INVENTION

This invention relates to a cotton harvester and more particularly to the discharge means for a cotton harvester. Still more particularly this invention relates to a blower device that includes a blower and a manifold having an opening in communication with the blower whereby the manifold will be pressurized. The pressurized manifold has outlets that are in communication by duct means with the cotton discharge conveying mechanism on the cotton harvester.

Heretofore it has been known to provide a blower on a cotton harvester that is connected directly to the duct leading to the cotton conveying conduits of a cotton harvester. Such a structure is shown in a U.S. pending application, Ser. No. 575,650, filed on Aug. 29, 1966, now Patent No. 3,378,309, by Russell D. Copley and Gail R. Sutherland. The problem that is created by having a direct duct connection between the blower and the discharge conduits of a cotton harvester lies in the condition that there are several discharge conduits and consequently several blower ducts are required for operating the harvester discharge system. In the Copley and Sutherland application the duct is connected to the discharge conduct above the harvester and the air is introduced into the conduit so as to blow in the direction of the outlet of the conduit. When a blower is utilized to discharge into a fitting having several outlets to different ducts, there is always the condition existing that one or more of the ducts will receive the greater quantity of air than the other ducts. Dampers may be used in the ducts to shut off a quantity of air, but generally such dampers require separate adjustment and, of course, there is always the element of human error involved. The quality of cotton that is harvested by a cotton harvester is very sensitive to various features. For example, if the air creating the movement of cotton through the discharge conduits is too great, the cotton will become soiled due to impact gainst various of the metal grates and panels in the discharge system. If the air is not sufficiently strong, there will be created conditions in which clogging occurs.

SUMMARY OF THE INVENTION

With the above in mind it is the primary object of the present invention to provide a manifold or chamber that is directly connected to the blower so that it is pressurized. The chamber is provided with discharge outlets on which may be coupled the various ducts that lead to the plurality of discharge conduits that move the cotton from the harvesting apparatus to the cotton container or basket on the cotton harvester.

It is a further object of the invention to construct the chamber of structural steel so that it may also be utilized as a part of the main frame of the cotton harvester. By so constructing the chamber it may be utilized as the basic support for the blower as well as the basic support for other of the drive mechanisms and parts of the cotton harvester.

BRIEF DESCRIPTION OF THE DRAWINGS

FIG. 4 is a sectional view taken substantially along the line 4—4 of FIG. 2.

DESCRIPTION OF THE PREFERRED EMBODIMENT

Figure 1:
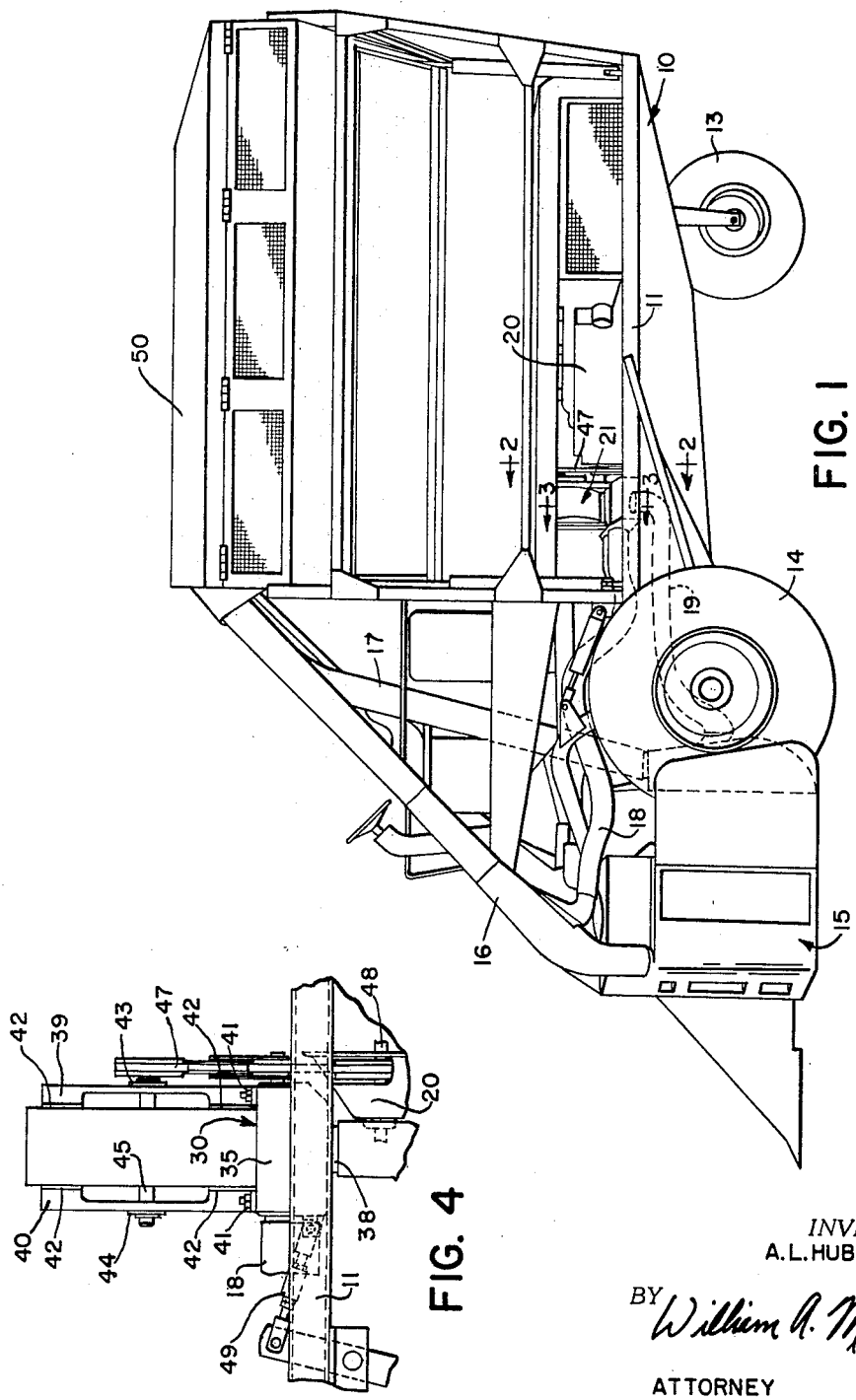
FIG. 1 is a side view of a cotton harvester utilizing the structure of the present invention.
Figure 2:
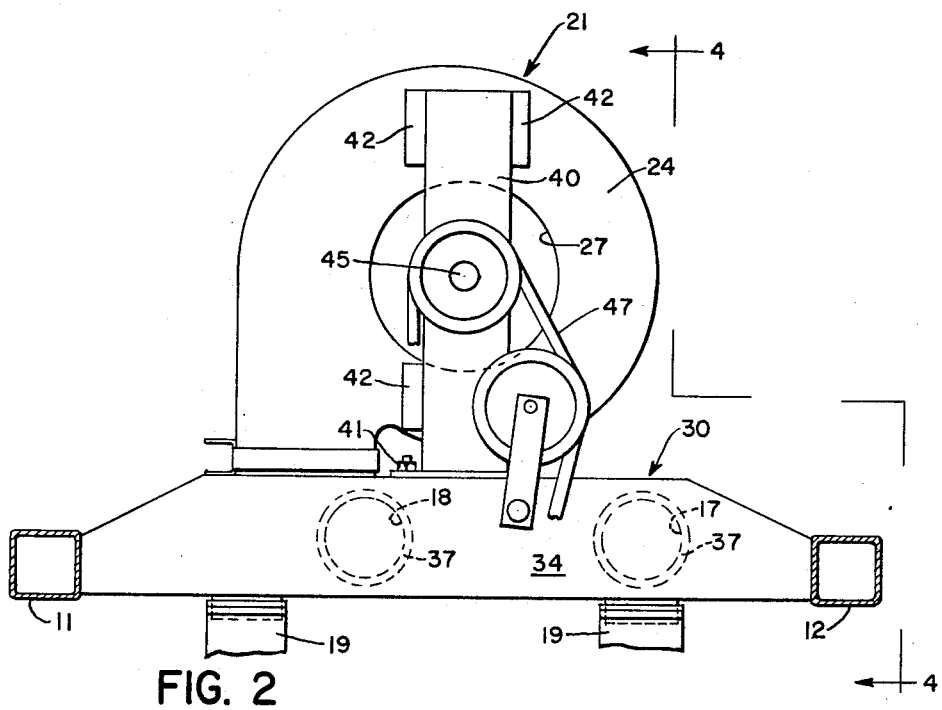
FIG. 2 is a sectional view taken substantially along the line 2—2 of FIG. 1.
Figure 3:
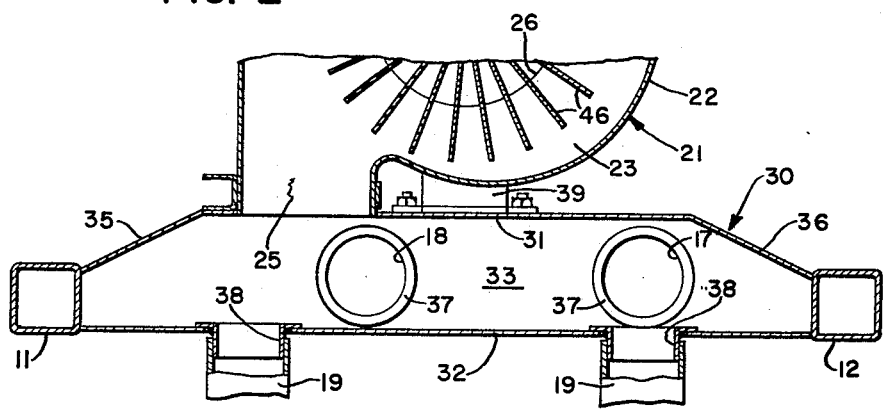
FIG. 3 is a sectional view taken substantially along the line 3—3 of FIG. 1.

The cotton harvester is composed of a main frame 10 having left- and right-hand transversely spaced structural beams 11, 12 extending the full length of the tractor portion of the harvester and supported at their rear ends by rear steerable wheels 13 and at their front ends by front traction wheels, one of which is shown at 14. The harvester structure also includes a pair of forwardly positioned harvesting units, the left-hand unit being indicated at 15. Normally there are two units for each harvester and each unit 15 includes a forwardly positioned discharge conduit 16 for moving cotton harvested by the harvesting unit outside of a row of plants and an inner discharge conduit 17 for moving the cotton harvested mechanism inwardly of the respective row of cotton. Thus, in a cotton harvester in which two harvesting units 15 are used, there will be two forward discharge conduits 16 and two centrally and rearwardly located conduits 17. Connected to the outer conduits 16 are blower ducts 18 and connected to the inner conduits 17 are blower ducts 19. In a two-row cotton harvester there will, of course, be two ducts 18 and two ducts 19. The general construction of the connection between the ducts 18 and conduits 16 is shown and described in detail in the aforementioned pending application Ser. No. 575,650, filed Aug. 29, 1966. The construction of the connection between the ducts 19 and the conduits 17 is shown and described in detail in a further pending U.S. application, Ser. No. 600,523, filed Dec. 9, 1966. If details of such connections and structure are desired, such may be had by reference to those patent applications.

Supported on the frame 10 and between the side beams 11, 12 is a main power source or engine 20. Adjacent the rear end of the engine 20 is the entire blower structure, indicated in its entirety by the reference numeral 21. The blower structure 21 is composed of a volute-shaped outer panel 22 and forward and rearward upright panels 23, 24 respectively that extend inwardly from the edges of the panel 22 and form therewith the housing for the blower. The housing has a blower discharge 25 directed downwardly and to one side of the housing. The panels 23, 24, as is conventional, have central openings 26, 27 respectively for permitting passage of air into the housing.

The entire blower structure 21 is supported on a chamber or manifold 30 having upper and lower horizontal walls 31, 32 respectively and front and rear upright walls 33, 34 respectively joining the edges of the upper and lower walls. The ends of the chamber or manifold 30 are closed by the inner sides of the fore-and-aft extending beams 11, 12. Inclined wall portions 35, 36 extend from the upper panel 31 to the upper inner edges of the beams 11, 12. The walls 31–36 are composed of structural steel so that the entire manifold or chamber 30 serves as a structural tie between the beams 11, 12 and does in fact serve as a part of the main frame 10. The upper wall 31 has an opening that receives the discharge outlet 25 of the blower 21. The front wall 33 has welded thereto a pair of collars or fittings 37 that receive the rear ends of the flexible ducts 18. The lower wall 32 has welded thereto a pair of fittings 38 that project downwardly and receive the rear ends of the ducts 19.

The blower 21 is supported on the chamber 30 by means of a pair of vertically projecting brackets 39, 40 adjacent to and forwardly and rearwardly of the respective sides 23, 24. The supports or brackets are bolted, as at 41, to the upper wall 31 and have upper and lower transversely projecting flanges 42 that lie adjacent to and are spot welded to the outer surfaces of the front and rear panels 23, 24. The supports 39, 40 also carry journals 43, 44 that support the rotor shaft 45 that carries the fan blades 46. The blower shaft 45 is driven by a V-belt drive, indicated in its entirety by the reference numeral 47 that projects downwardly to a driving connection 48 with the engine 20.

As indicated previously, the entire chamber 30 operates as a transverse beam that ties the side beams 11 and 12 together. Referring to FIG. 4, it will be noted there is a turnbuckle 49 anchored to the chamber 30 and is adjustable to anchor other structure of the harvester. Specifically the turnbuckle 49 is operated to adjust the vertical height of the harvesting units 15. However, its exact use and purpose are not important other than to recognize that the beam channel 30 is of sufficient strength to operate as part of the main frame.

In operation, the blower 21, being in communication with the chamber 30, pressurizes the entire chamber and air then flows out through the respective fittings 37, 38 and into the flexible ducts 18, 19. Of prime importance in providing the manifold or chamber 30 is the fact that the chamber 30 will have uniform pressure throughout. Consequently the air moving out of the respective outlets to the ducts 18, 19 will have similar and substantially equal pressure. This will insure both adequate pressure in the discharge conduits 16, 17 as well as sufficient velocity within the conduits to move uniformly the cotton into the container 50 that is positioned to receive the cotton from the conduits 16, 17.

I claim:
1. In a cotton harvester having a main frame that includes a pair of fore-and-aft extending transversely spaced main beams extending between and supported on front and rear wheels and having thereon an engine for operating the harvester, harvesting apparatus forwardly of the engine for harvesting rows of cotton including a plurality of conveying ducts discharging into a cotton container, the improvement residing in: a transverse rigid hollow chamber structurally tying the side beams together adjacent an end of the engine; a blower driven by the engine and supported on the upper side of the chamber having a downwardly directed discharge opening into the chamber for effecting a pressurized chamber; a plurality of outlets in the chamber; and a plurality of flexible ducts, each being connected to an outlet and extending to and opening into the conveying ducts for forcing streams of air through the conveying ducts.

2. The structure as set forth in claim 1 in which the chamber has upper, lower, front and rear walls, the blower is supported above the upper wall and discharges downwardly through the upper wall; part of the outlets open through the front wall and part open through the lower wall.

3. The structure as set forth in claim 2 in which the blower is disposed forwardly of one end of the engine and there is provided flexible vertical drive to the blower that extends downwardly and rearwardly of the rear wall to the engine.

4. The structure as set forth in claim 1 in which the chamber is constructed of structural steel and forms a rigid integral part of said main frame.

5. In a cotton harvester having a main frame, harvesting apparatus forwardly of the engine for harvesting rows of cotton including a plurality of conveying ducts discharging into a cotton container, the improvement residing in: a hollow chamber supported on the frame adjacent an end of the engine; a blower driven by the engine and supported on the upper side of the chamber having a downwardly directed discharge opening into the chamber for effecting a pressurized chamber; a plurality of outlets in the chamber; and a plurality of flexible ducts, each being connected to an outlet and extending to and opening into the conveying ducts for forcing streams of air through the conveying ducts.

6. In a cotton harvester having a main frame, harvesting apparatus forwardly of the engine for harvesting rows of cotton including a plurality of conveying ducts discharging into a cotton container, the improvement residing in: a hollow chamber supported on the frame adjacent the engine; a blower driven by the engine and supported on the chamber having a discharge opening into the chamber for effecting a pressurized chamber; a plurality of outlets in the chamber; and a plurality of duct means, each being connected to an outlet and having an outlet adjacent to and adapted for forcing a stream of air through a conveying duct.

7. The structure as set forth in claim 6 in which the blower is supported on the chamber by a pair of structural elements fixed to and projecting from the chamber and having journal means at their respective ends for supporting a blower rotor shaft.

8. The structure as set forth in claim 6 in which the chamber is constructed of structural steel that is rigid with and forms a part of the main frame, and the blower is supported on and above the chamber and opens downwardly into the chamber for purposes of pressurizing the chamber.

References Cited

UNITED STATES PATENTS 3,378,309  4/1968  Copley et al. _____ 302—17

ANDRES H. NIELSEN, Primary Examiner

U.S. Cl. X.R.

56—12; 302—59